(12) United States Patent  
Perry

(10) Patent No.: US 6,601,834 B2  
(45) Date of Patent: Aug. 5, 2003

(54) GAS SPRING LOCK APPARATUS AND METHOD

(76) Inventor: Gary L. Perry, 3325 W. Cedar Meadows La., Manhattan, MT (US) 59741

( * ) Notice: Subject to any disclaimer, the term of this patent is extended or adjusted under 35 U.S.C. 154(b) by 0 days.

(21) Appl. No.: 09/881,930

(22) Filed: Jun. 15, 2001

(65) Prior Publication Data

US 2002/0050003 A1 May 2, 2002

Related U.S. Application Data

(63) Continuation-in-part of application No. 09/699,103, filed on Oct. 27, 2000.

(51) Int. Cl.[7] ................................................. F16F 9/32
(52) U.S. Cl. ..................................... 267/64.12; 188/300
(58) Field of Search ......................... 207/64.12; 188/300

(56) References Cited

U.S. PATENT DOCUMENTS

| 550,252 A | 11/1895 | Fettes |
| 4,596,383 A | * 6/1986 | Howard ................. 267/64.12 |
| 4,813,100 A | * 3/1989 | King ...................... 267/64.12 |
| 4,853,985 A | 8/1989 | Perry |
| 4,857,374 A | 8/1989 | Perry |
| 4,991,238 A | 2/1991 | Forrest |
| 5,131,102 A | 7/1992 | Salley et al. |
| 5,358,225 A | * 10/1994 | Volpel et al. ................ 188/300 |
| 5,471,685 A | 12/1995 | Cross |
| 5,517,703 A | 5/1996 | Ouelette |
| 5,566,403 A | 10/1996 | Black et al. |
| 5,575,513 A | * 11/1996 | Tuttle ..................... 267/64.12 |
| 5,584,081 A | 12/1996 | Ouelette |
| 5,634,218 A | 6/1997 | Ouelette |
| 5,644,803 A | 7/1997 | Wilson |
| 5,689,841 A | 11/1997 | Black et al. |
| 5,819,332 A | 10/1998 | Perry |
| 5,974,599 A | 11/1999 | Tudor |
| 5,996,137 A | 12/1999 | Genova |
| 6,273,405 B2 | * 8/2001 | Okamoto ................. 267/64.12 |

OTHER PUBLICATIONS

AQUA Magazine article, Jun. 1996 Issue, entitled "Rising to the Occasion" by Alan E. Sanderfoot.
Promotional information brochure by CEnTech Corporation.

* cited by examiner

Primary Examiner—Matthew C. Graham
(74) Attorney, Agent, or Firm—William Forster

(57) ABSTRACT

A gas spring lock for engaging and locking a gas spring in the extended position so that covers of spas, hot tubs and other similar apparatus that employ gas springs can be safely locked into an open position. A gas spring lock includes an elongate locking arm that extends along the piston of a gas spring, toward the cylinder thereof. Typically, the locking arm is longitudinally fixed in relation to the piston of the gas spring. The locking arm includes a notch which is defined by a portion of the locking arm. The notch is provided to engage the step that is formed between the piston and the cylinder of the gas spring. Importantly the locking arm is shiftable from a first disengaged position where the notch is spaced from the step, adjacent the cylinder, when the gas spring is in a compressed configuration, to a second locking position, when the gas spring in the extended configuration, where the notch engages the step to block the cylinder from receiving the piston and returning to the compressed configuration.

14 Claims, 8 Drawing Sheets

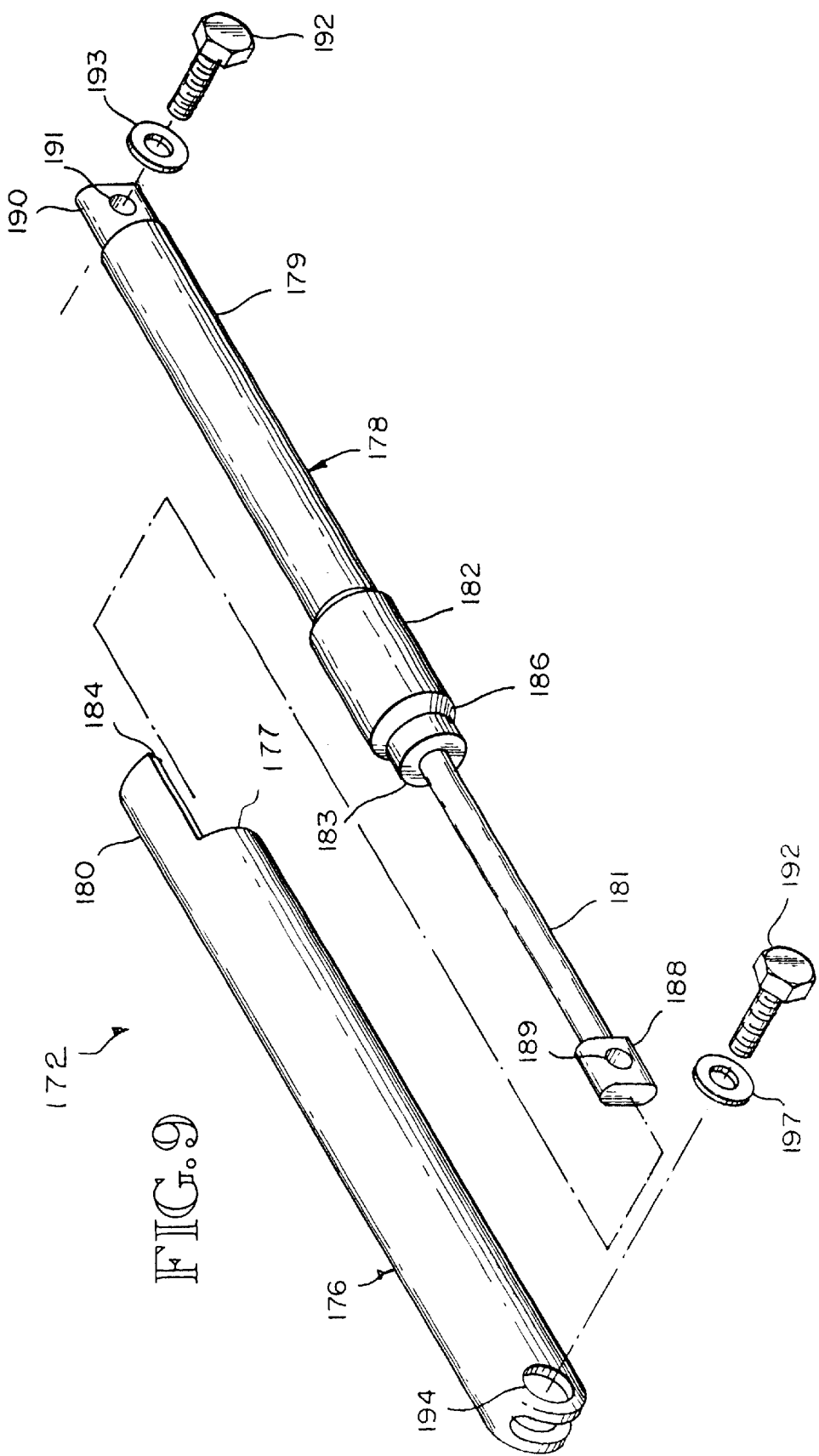

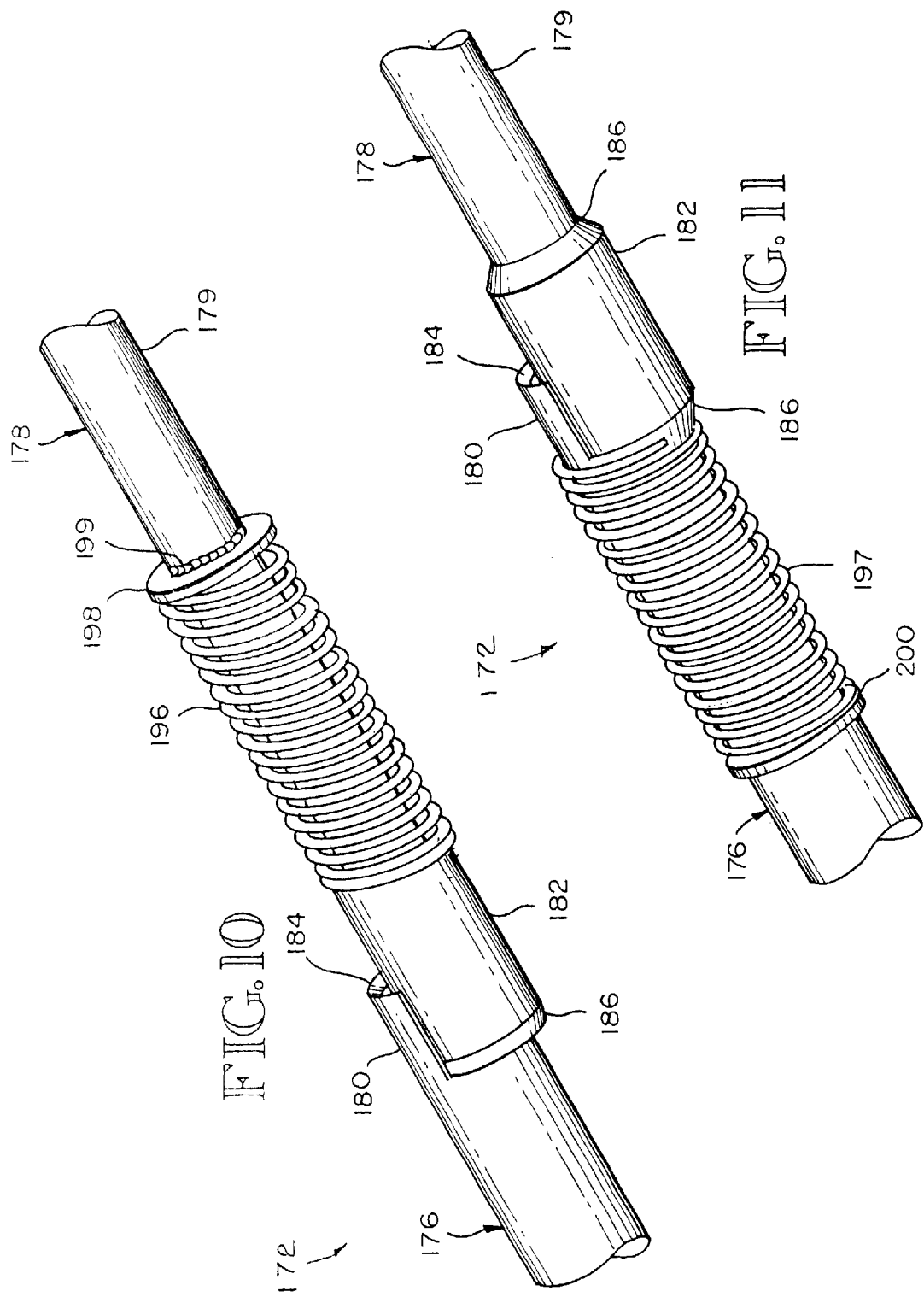

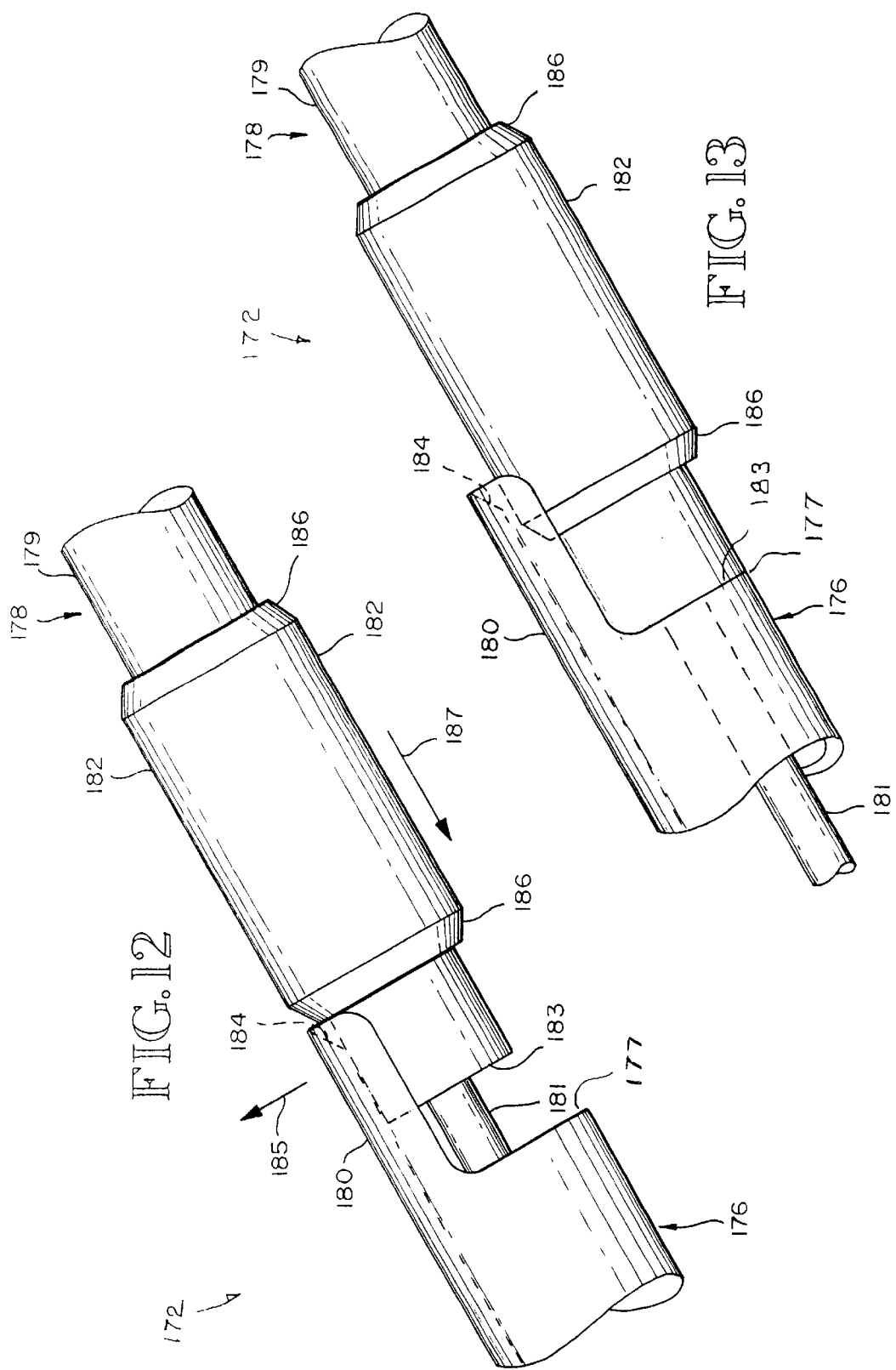

GAS SPRING LOCK APPARATUS AND METHOD

This application is a continuation-in-part of Ser. No. 09/699,103 filed Oct. 27, 2000 pending for a SPA COVER REMOVAL APPARATUS AND METHOD

BACKGROUND

This invention relates generally to hot tubs and spas, and more particularly to removal systems that include gas springs adapted for assisting in the removal of hot tub covers.

Spa cover removal systems and mechanisms are known in the art. Such mechanisms vary widely in complexity, ease of operation and cost of manufacturing. In recent years, the rise in popularity of spas, commonly referred to as hot tubs, has hastened the development of spa covers and removal apparatus therefor. One early design for cover removal is disclosed in U.S. Pat. No. 4,857,374 issued to Perry (Gary L.) in 1989. The Perry design employs gas springs that extend from the sides of a spa to a spa cover that is hinged to the rear of the spa. In this way, the gas springs assist the user to pivot the cover to a vertical position, away from the top of the spa.

U.S. Pat. No. 4,853,985 issued to Perry (Cliff R.) in 1989 shows a cover assembly for use with a spa. The cover assembly includes a cover member mounted for rotational movement to the spa structure by mounting arms. The mounting arms are arranged relative to the cover member so that the cover member travels along a path from a covering position to an open position. Additionally, the '985 device includes tension springs. Because of the arrangement of the mounting arms and their attachment to the spa cover, the design is not easily adaptable for use with spa covers that fold back to expose only a portion of the spa.

U.S. Pat. No. 4,991,238 issued to Forrest in 1991 shows a spa cover lift that includes one or more struts for positioning a movable frame adapted for pivotable attachment to the side of a spa. The lift includes apparatus for receiving a spa cover from the spa and retaining the cover adjacent the movable frame. The struts are operable to displace the movable frame to an extended position to provide a surface onto which a spa user can slide a spa cover. Because the Forrest device requires that the entire spa cover be moved rearward onto the movable frame, a single user could find it difficult to slide a large heavy cover.

U.S. Pat. No. 5,131,102 issued to Salley in 1992 shows a device for use in conjunction with a spa cover mounted for pivotal movement to facilitate the removal of the cover away from the vicinity of the spa when the same is in use. A bridge arm supported by two side arms is pivotally attached to a base. The bridge arm can be pivoted into position adjacent the spa cover. With the spa cover folded over, the bridge arm is pivoted clearly away from the spa. The arrangement of the '102 device is such that it provides support to the spa cover only at the cover's folding point during the removal process. Accordingly, a portion of the cover slides over the spa as a user operates the device to remove the cover.

U.S. Pat. No. 5,471,685 issued to Cross in 1995 shows a support for a cover of a hot tub spa having a pair of roller support arms, each having a pivotal connection for securing it to the spa. The pivotal connections each comprise an attachment member for mounting on a vertical outer wall of the spa, with a hinge connecting the support arm to its attachment member for pivotal movement between operative and inoperative positions. Like the Forrest device, the entire spa cover must be moved rearward onto the frame.

U.S. Pat. No. 5,517,703 issued to Ouelette in 1996 shows a lifting mechanism for removing and restoring a hinged spa cover from a spa tub. Two tubular brackets are cojoined so that base members on the brackets are aligned parallel, adjacent to one end of the spa, and arms on the brackets extend along opposite sides of the spa. The cojoined base members are pivotally mounted so that the lifting arms are rotatable between a first lowered position and a second raised position. Support beams are connected to the lifting arms over which the hinged sections of the cover are foldable when the arms are in the first position allowing the cover to be lifted clear of the spa when the arms are moved to the second raised position. Like the Salley device, the '703 cover removal apparatus, during the removal process, provides support to the spa cover only at the cover's folding point.

U.S. Pat. No. 5,584,081 issued to Ouelette in 1996 shows a lifting frame for a hinged spa cover having a pair of adjustable lifting arms pivotally mounted adjacent the side walls of a spa. A U-shaped foot actuated lever is connected to the lifting arms with the base of the lever extended across one end wall of the spa. The upper part of the arms are equipped with one or more supports that are adjacent to and parallel with the cover hinge whereby the cover is foldable over the support or supports when the lifting arms are in a first position. The foot lever is elevated when the lifting arms are in the first position, and depressing the lever causes the arms to be rotated to a second position whereby the folded cover is supported in a vertical position adjacent one end wall of the spa. Like the earlier Ouelette invention, the spa cover is supported only at its folding point.

U.S. Pat. No. 5,634,218 issued to Ouelette in 1997 shows a lifting frame for a hinged spa cover having a pair of adjustable lifting arms pivotally mounted on or adjacent to a side wall of a spa. The upper part of the arms are equipped with one or more supports that are adjacent to and parallel with the cover hinge with the cover being foldable over the support or supports when the lifting arms are in a first horizontal position. Rotation of the frame causes the folded cover to be rotated to a second, vertical position adjacent one end wall of the spa. Similar to the other Ouelette devices, this design provides support to the spa cover only at its folding point.

U.S. Pat. No. 5,644,803 issued to Wilson in 1997 shows a spa support assembly that is provided with a plurality of support arms having upper and lower ends with the lower ends pivotally attached to an external surface of the spa side wall for pivotal rotation of the upper ends of the support arms through an arc from a point above and adjacent to the side wall to a point away from the side wall at a point where the upper ends of the support arms are within the generally horizontal plane defined by the top surfaces of the side walls and at a distance away from the side wall. Like the prior '238 and '685 patents, the Wilson device requires that the user slide the spa cover rearward over the spa during the removal process.

While most of the above noted designs assist in the removal process of a spa cover from a spa, they typically do not provide a simple, safe, inexpensive and adjustable means to remove and support the spa cover in a compact position which allows unimpeded access to the spa. Accordingly, a need remains for a spa cover removal apparatus that facilitates the easy removal of a spa cover by a single user which is safe, and easy to install and use.

SUMMARY OF THE INVENTION

One object of the present invention is reduce the effort required to remove a spa cover from a spa.

A second object is to facilitate the removal of a spa cover from a spa by only one person.

Another object is to protect expensive spa covers by simplifying the removal process thereof from a spa.

Yet another object is to reduce the expense of heating water in spas by promoting the use of spa covers that are easily removed by one person.

A further object is to increase the safety of using a cover removal apparatus.

Still another object is to fully support a spa cover in a compact manner thereby minimizing the space taken by the stowed cover following the removal process.

The invention is a spa cover removal apparatus for assisting a person in the repositioning and removal of a spa cover from a spa. Typically, spa covers are constructed such that they include opposing left and right cover side surfaces and a centrally disposed fold side surface extending between the same. To this end, the present invention is designed to work with spas that are typically arranged to include a back side disposed between opposing left and right vertical surfaces. In addition, decking is sometimes provided adjacent the surfaces of the spa.

Broadly stated, the spa cover removal apparatus comprises left and right pivot arm assemblies spaced apart to receive and secure thereto opposing cover side surfaces between the same for supporting the spa cover. In addition, left and right side bracket assemblies are disposed to receive the respective left and right pivot arm assemblies for pivotally supporting the same, wherein each left and right side bracket assembly is fixed in relation to the spa.

Disposed between each side bracket assembly and its respective pivot arm assembly is a gas spring for simultaneous biasing each pivot arm assembly to pivot upward. This arrangement enables the spa cover to easily shift, when an upward force is applied in combination with the biasing force of the gas spring. Accordingly the spa cover shifts from a first horizontal covering position over the spa, where the gas spring is in a first axially compressed biasing condition, to a second, substantially vertical stowed position adjacent the back surface of the spa as the left and right pivot arm assemblies pivot relative to the left and right side bracket assemblies in response to the combined applied upward force and the biasing force of the gas spring as the same extends to a second elongated uncompressed condition.

In another aspect of the invention, at least one gas spring lock is disposed to engage a portion of the gas spring to lock the same in the second uncompressed condition when the spa cover shifts to the second stowed position. In this way, the locked gas spring allows a user to prevent the spa cover from returning to the first horizontal covering position over the spa while the same is in use.

The foregoing and other objects, features, and advantages of this invention will become more readily apparent from the following detailed description of a preferred embodiment which proceeds with reference to the accompanying drawings, wherein the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF THE DRAWINGS

FIG. 9 is an exploded view of an alternate embodiment gas spring lock illustrating a locking collar having chamfered edges.

FIG. 10 is an alternate embodiment gas spring lock having a locking collar that is biased toward the locking tab by a spring that is in compression.

FIG. 11 is an alternate embodiment gas spring lock having a locking collar that is biased toward the locking tab by a spring that is in tension.

FIG. 12 is an illustration showing a gas spring lock in the disengaged first unlocked position.

FIG. 13 is an illustration showing a gas spring lock in the second engaged, locking position with the locking collar biasing the locking tab away from the cylinder.

DETAILED DESCRIPTION OF PREFERRED EMBODIMENT

Figure 1:
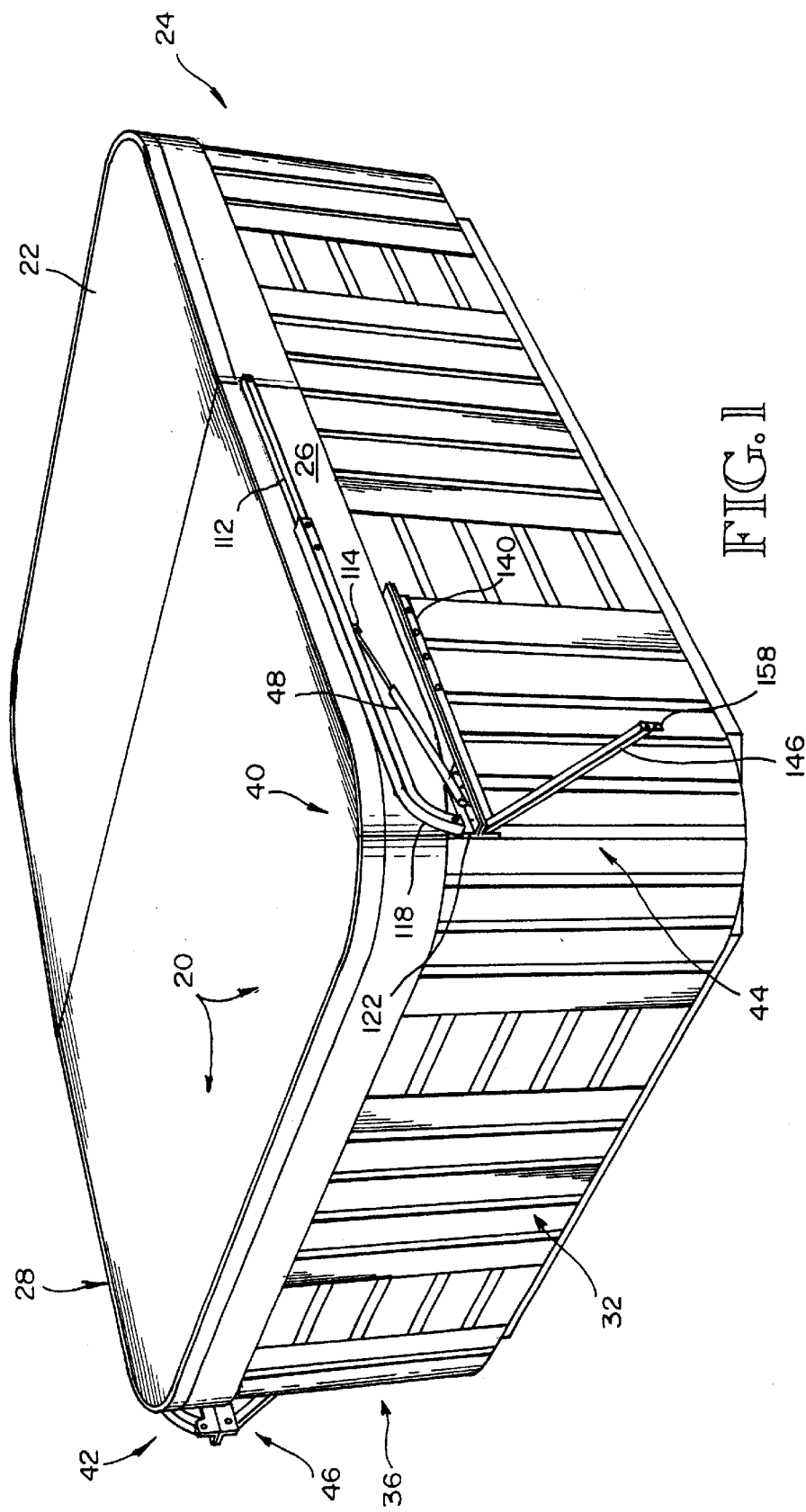
FIG. 1 is a rear perspective view of the preferred embodiment spa cover removal sapparatus installed on a spa having a spa cover.

FIGS. 1 through 8 show a preferred embodiment of a spa cover removal apparatus 20. A spa cover removal apparatus 20 is provided for assisting a person in the repositioning and removal of a spa cover 22 from a spa 24. Typically, spa covers are constructed such that they include opposing left and right cover side surfaces 26, 28 and a centrally disposed fold side surface 30 extending between the same. To this end, the present invention is designed to work with spas that are typically arranged to include a back side 32 disposed between opposing left and right vertical surfaces 34, 36 wherein decking 38 is provided adjacent the left and right vertical surfaces 34, 36.

Broadly stated, the spa cover removal apparatus 20 comprises left and right pivot arm assemblies 40, 42 spaced apart to receive and secure thereto opposing cover side surfaces 26, 28 between the same for supporting the spa cover 22. In addition, left and right side bracket assemblies 44, 46 are disposed to receive the respective left and right pivot arm assemblies 40, 42 for pivotally supporting the same, wherein each left and right side bracket assembly 44, 46 is fixed in relation to the spa 24.

Disposed between each side bracket assembly and its respective pivot arm assembly is a gas spring 48 for simultaneously biasing each pivot arm assembly 40, 42 to pivot in an upward direction. This arrangement enables the spa cover 22 to shift, as an upward force is applied with minimal user effort, from a first horizontal covering position over the spa (FIG. 3) where the gas spring is in a first axially compressed condition creating a biasing force, to a second, substantially vertical stowed position adjacent the back side 32 of the spa 24 (FIG. 4) as the left and right pivot arm assemblies 40, 42 pivot relative to the left and right side bracket assemblies 44, 46 in response to the combined applied upward force and the biasing force of the gas spring 48 as the same extends to a second elongated uncompressed condition.

Considering now in more detail the structure of the components from which a spa cover removal apparatus 20 is constructed, it should be understood that all of the components disposed on the left side of the spa 24 are a mirror image of the components disposed on the right side of the spa 24, i.e., two independent sets of "mirror image" like components are employed. Accordingly, detailed illustrations of only the components of the left side are generally illustrated in FIGS. 1 through 8. In addition, it should be understood that the left side of the spa 24 is determined from the perspective of a person standing in front thereof.

Figure 2:
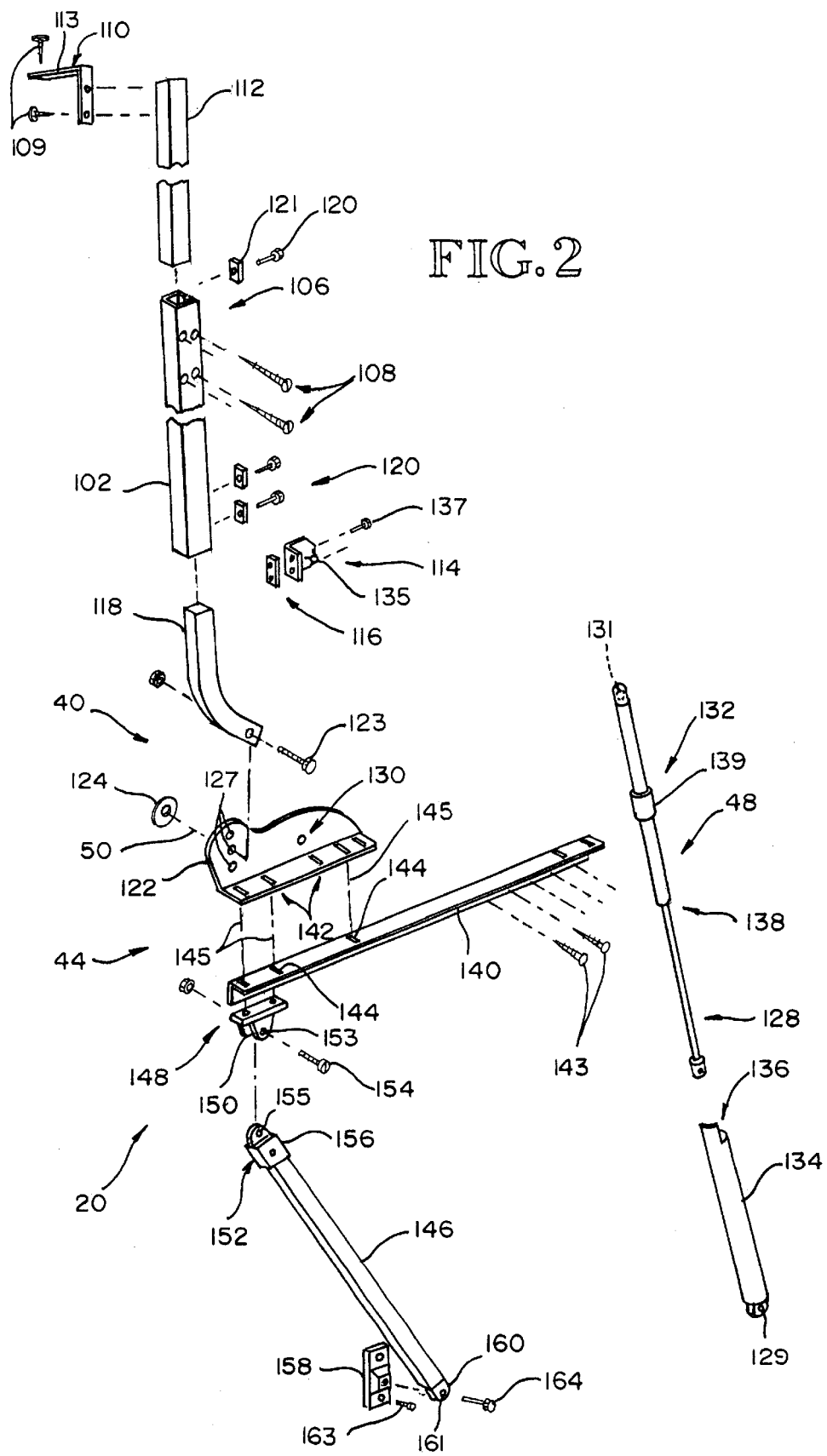
FIG. 2 is an exploded view of the left side of a spa cover removal apparatus, wherein the right side (not illustrated) is constructed as a mirror image thereof.
Figure 6:
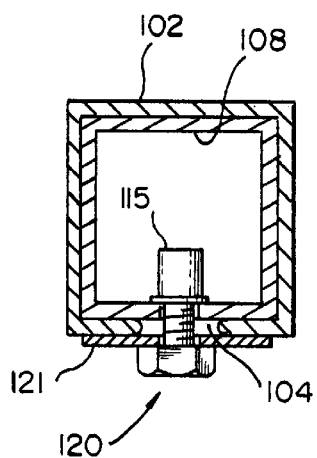
FIG. 6 is a cross sectional view taken along 6—6 (FIG. 4) illustrating a slot tube disposed over a portion of a pivot tube.

Turning now to FIGS. 1 and 2, the components for a spa cover removal apparatus 20 are illustrated. Attached directly to the left cover side surface 26, of spa cover 22, is a left pivot arm assembly 40. Included therein is a channel 102. The channel 102 is constructed from square tube and shaped in the form of a channel thereby having a slot 104 its entire length, on the under side thereof (as best illustrated in FIG. 6). The channel 102 is attached directly to the left cover side surface 26, at a point approximately 27 inches from the rear of the spa cover 22. This way, a metal plate (not illustrated) embedded within the spa cover 22 can be employed as the point of attachment.

For this purpose, 4 holes 106, through which 4 flathead screws 108 can be guided are provided. The flathead screws 108 extend entirely through holes 106 and into countersunk aligned holes (not illustrated). As will be more fully discussed below, this construction results in a unobstructed channel for a extension tube that fits within the channel 102.

Specifically, an angle bracket 110 is attached via sheet metal screws 109 to an extension tube 112 as illustrated in FIG. 2. With the angle bracket 110 so attached, the extension tube 112 is oriented and guided into the channel 102 to a point where the angle bracket 110 rests against the fold side surface 30 of a folded spa cover 22. At this point, the leg 113 of the angle bracket 110 is screwed by sheet metal screws 109 to a metal plate (not illustrated) that is disposed just under the fold side surface 30. The extension tube 112 is then secured to the channel 102 by a bolt 120 with a fender washer 121 (similar to FIG. 6) where the bolt engages a cap nut 115 previously secured in the wall of the extension tube 112.

Also included in the left pivot arm assembly 40 is a ball stud bracket 114, and its mating nut plate 116 which is sandwiched within the channel 102 for purposes of receiving and engaging the cylinder end of a gas spring 48 as will be more fully described below.

At the opposing end of the channel 102, a pivot tube 118 is placed within channel 102, and secured by bolts 120 along with fender washers 121 as illustrated in FIG. 6.

Accordingly, the pivot tube 118, channel 102, extension tube 112 and angle bracket 110 comprise the primary components of the left pivot arm assembly 40. Importantly, the pivot tube 118 is properly positioned within the channel 102 by attaching (bolting) a base bracket 122 by bolt 123 and plastic washer 124, along with an appropriate nut thereto as best illustrated in FIG. 2, and aligning the rear of the base bracket 122 with the back side 32 of spa 24. With the base bracket 122 so aligned, the bolts with fender washers are secured against the channel 102 to fix the pivot tube 118 into its final position.

Figure 5:
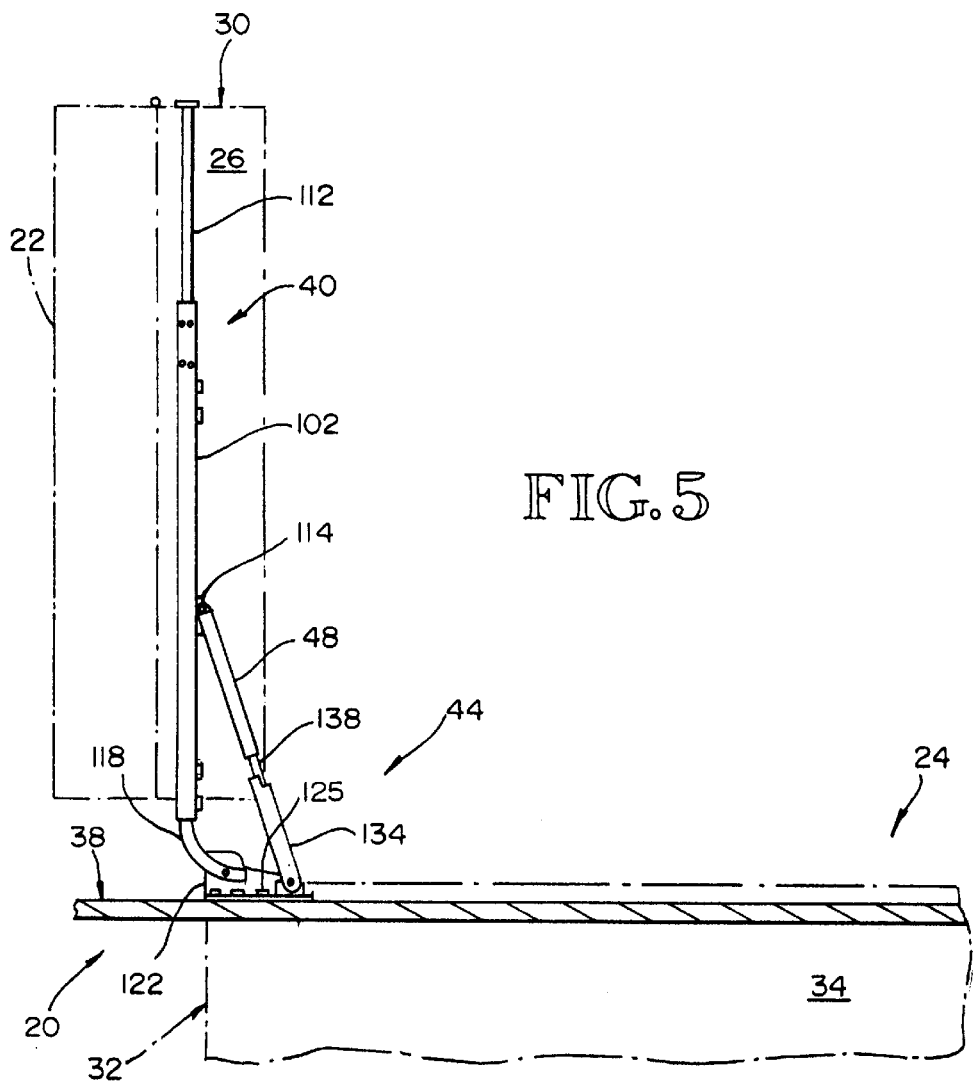
FIG. 5 is a left side elevation view of a spa cover removal apparatus installed on a spa with a spa cover disposed in the second stowed position adjacent the back surface of the spa wherein a deck surrounds the spa at an elevation slightly below the top of the spa shell.

Directing attention to FIG. 5, an application of the present invention is illustrated where a deck 38 is disposed near the upper regions of the spa 24. Accordingly, the base bracket 122, in this situation, can be installed directly onto the deck 38 by wood screws 125, or alternately by employing wood shims (not illustrated) between the deck 38 and the base bracket 122.

With this construction, a gas spring 48 is connected between the base bracket 122 and the ball stud bracket 114. Specifically, the piston 128 of gas spring 48 is arranged to have a socket 129 connected to a ball stud 130 disposed on base bracket 122. Similarly, the cylinder 132 is connected to the ball stud 135 of bracket 114 by socket 131. Accordingly, the ball stud bracket 114 is properly positioned by moving the spa cover 22 to the second stowed "vertical" position as illustrated in FIG. 5. At this point the bolts 137 of the ball stud bracket 114 are secured against channel 102 while the gas spring 48 is fully open, i.e, uncompressed. Importantly, the matching mirror image components are similarly positioned on the opposite side.

Figure 7:
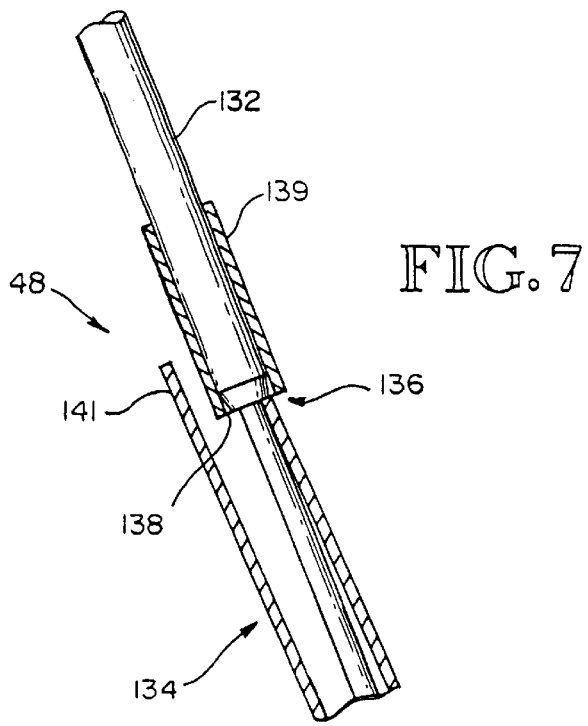
FIG. 7 is a cross sectional view of a gas spring lock disposed by gravity to the locking position when a spa cover is in the second stowed position, to the rear of the spa wherein a locking collar is engaging the gas spring lock so that the same cannot shift to the unlocked position.

In order to lock the spa cover 22 in the second stowed position, a gas spring lock 134 is pre installed over the piston 128, of the gas spring 48 as illustrated in FIG. 7. For this purpose, the gas spring lock 134 includes one end constructed with opening 133 to engage the ball stud 130, thereby preventing relative coaxial movement between the gas spring lock 134 and the piston 128 of gas spring 48. Further, as will be more fully discussed below, the opposite end of the gas spring lock 134 defines a notch 136.

When the spa cover 22 is in the second stowed position, notch 136 is constructed to rest on the step 138 (FIG. 7), that is created by the piston/cylinder transition of the gas spring 48. In this way, the gas spring 48 is locked into position, i.e., the gas spring 48 cannot be compressed. As a further locking measure, a locking collar 139 is provided. Specifically, locking collar 139 is a tubular section of material of a diameter which allows it to be coaxially disposed around the cylinder 132 of the gas spring 48. Accordingly, when the gas spring 48 is fully extended as illustrated in FIG. 7, it is oriented so that gravity causes the gas spring lock 134 to incline such that the notch 136 is aligned to oppose step 138 thereby preventing the cylinder from moving toward base bracket 122. In this way the spa cover 22 is prevented from returning to the first horizontal covering position.

Moreover, while the gas spring is in this position, the locking collar 139 can be moved down the cylinder 132 such that locking tab 141 is prevented from returning to a position adjacent the cylinder 132. In this way, the gas spring lock is positively locked into its locking position.

Figure 8:
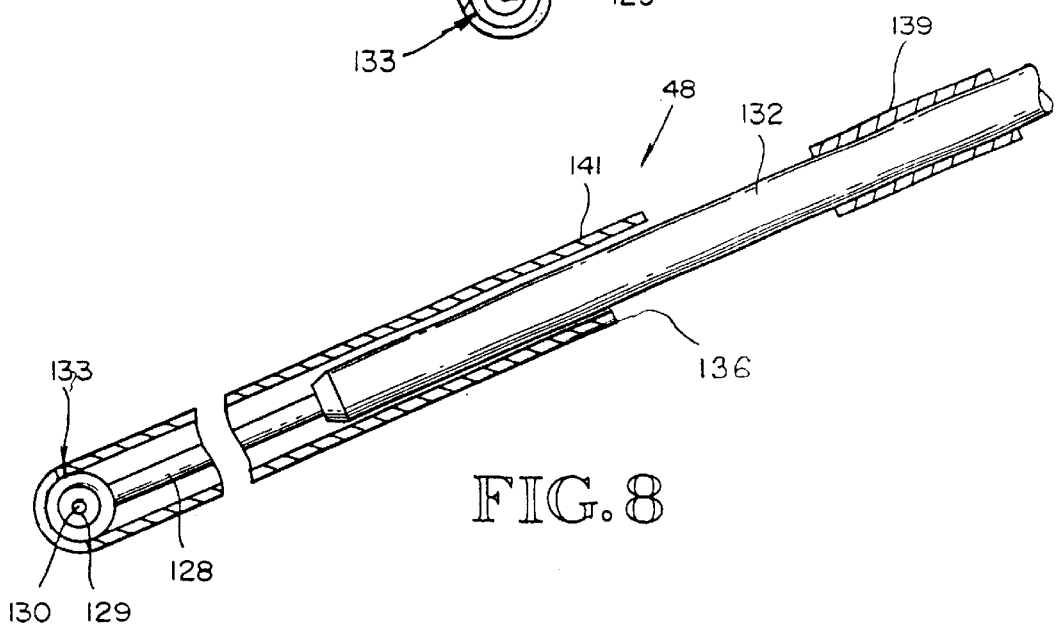
FIG. 8 is a cross sectional view of a gas spring lock disposed by gravity to the unlocked position when a spa cover is disposed in the first horizontal covering position over the spa wherein a locking collar is spaced from the gas spring lock thereby allowing the locking tab, of the gas spring lock, to rest on the cylinder to coaxially align the gas spring lock thereto.

In contrast, the gas spring lock 134 can be unlocked by moving the locking collar 139 upward, past the locking tab 141, wherein the same can be moved adjacent the cylinder 132 so that the cylinder is coaxially aligned with the gas spring lock 134, thereby permitting downward movement within the gas spring lock 134 as illustrated in FIG. 8. In this way, the spa cover 22 can shift to the first horizontal covering position over the spa 24.

Figure 3:
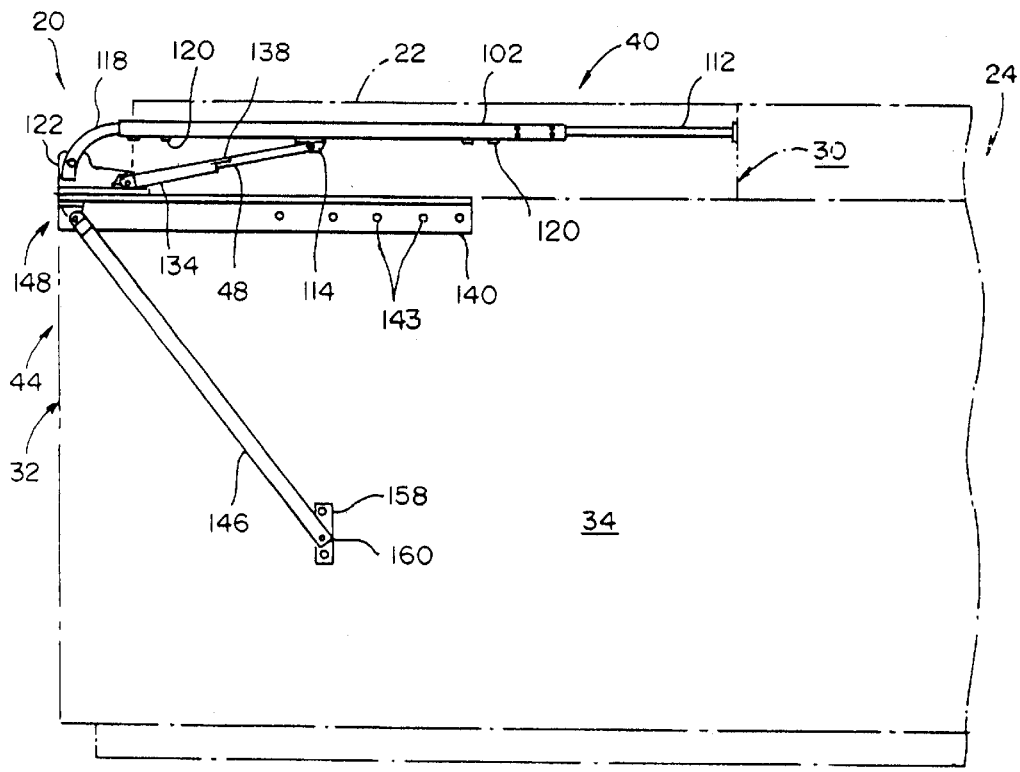
FIG. 3 is a left side elevation view of a spa cover removal apparatus installed on a spa with a spa cover disposed in the first horizontal covering position over the spa.
Figure 4:
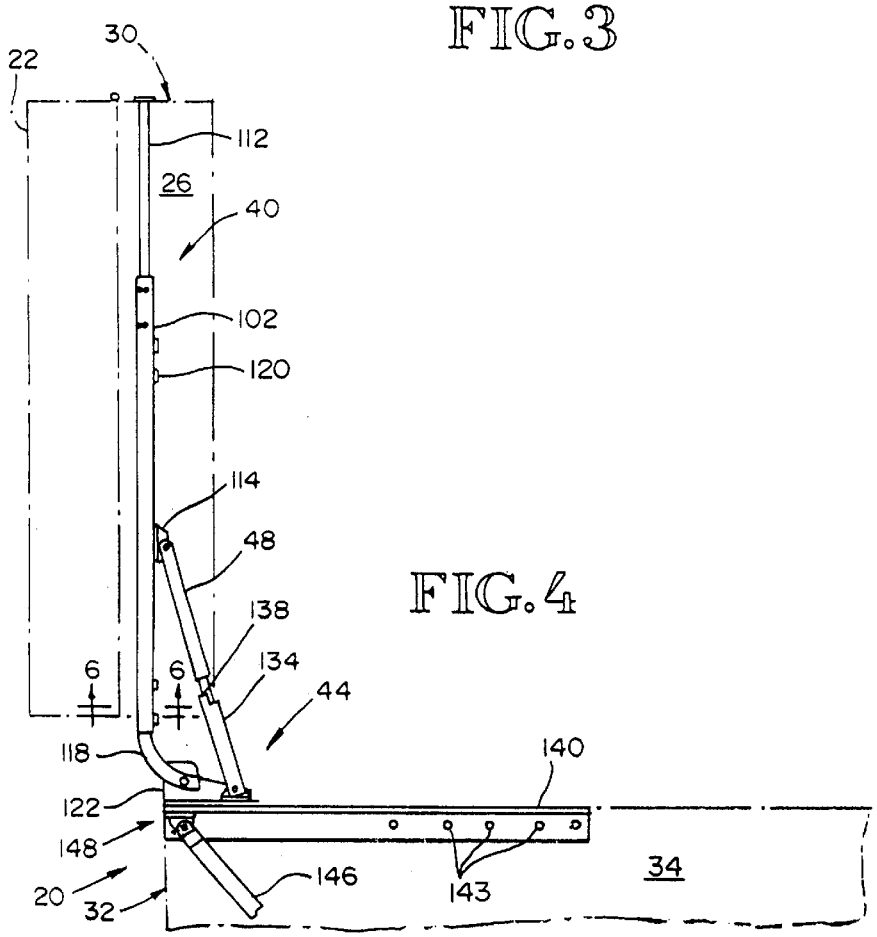
FIG. 4 is a left side elevation view of a spa cover removal apparatus installed on a spa with a spa cover disposed in the second stowed position adjacent the back surface of the spa.

In certain situations, the deck 38 falls well below the top region of the spa. Accordingly, a base bracket 122 cannot be shimmed or attached directly to the wood deck 38. In such situations, the base bracket 122 is attached by bolts 145 to one end of an auxiliary bracket 140 which is fabricated from an angle section of metal. The auxiliary bracket 140 is, in turn, attached with screws 143 (horizontally) near the uppermost region of the left or right vertical surface 34, 36 of the spa 24 as best illustrated in FIGS. 3 and 4. As noted earlier, the outer most portion of the base bracket 122 is aligned with the back side 32 of the spa 24. In the present invention, the base bracket 122 is constructed with a series of slots 142 for alignment with predrilled holes 144 in the auxiliary bracket 140 for final bolting by bolts 145.

In addition, a support tube 146 is employed as a brace to distribute forces imposed on the base bracket 122. For this purpose, a deck hinge 148 is bolted to the underside of the auxiliary bracket 140 using the same bolts used to attach the base bracket 122 to the auxiliary bracket 140. The deck hinge 148 is constructed to define a pivot attachment member 150 which includes hole 153 for pivotally engaging the boss 155 of a plastic end mating pivot fitting 152 which is disposed on the end of the support tube 146. In this way, a bolt or screw 154 can be employed to pivotally connect the deck hinge 148 to the support tube 146. Because only compression forces are generally present, a set screw 156 can be employed to secure the pivot fitting 152 over the end of support tube 146.

For final attachment of the support tube 146 to the spa vertical surface 34, a side hinge 158 is pivotally attached to a end fitting 160 fixed to the lower end of the support tube 146. This way the support tube 146 can be positioned so that the side hinge 158 is approximately 18 inches below the auxiliary bracket 140, and slants downward at approximately 45 degrees to 60 degrees. In order to assure the support tube 146 falls within these parameters, the same may have to be modified, i.e., cut to length.

Turning now to FIGS. 9 through 13, additional embodiments of a gas spring lock are illustrated. Specifically FIG. 9 illustrates gas spring lock 172 adapted for engaging and locking a gas spring 178 of the type having a piston 181 that includes a connection head 188. The piston 181 extends from the connection head 188 coaxially into a cylinder 179 which slidingly receives the piston 181. At the point where the cylinder 179 receives the piston 181, a step 183 is defined by the cylinder 179. It should be noted that the step 183 forms a shoulder that could be square to the outer cylindrical surface of the cylinder (as illustrated), or alternatively could be sloped (not illustrated) depending on the manufacturer of the gas spring.

Typically, the cylinder extends from the step 183 to an opposing connection head 190 defined at the end of the opposite end of the cylinder 179. Importantly, the gas spring 178 is movable from a compressed configuration where the piston 181 is substantially received into the cylinder 179 (similar to FIG. 8), to an extended configuration where the piston 181 is substantially out of the cylinder 179 (similar to FIG. 7).

One embodiment of the gas spring lock 172 comprises an elongate locking arm 176 that extends along the piston 181, wherein a portion of the locking arm 176 defines a notch 177 disposed adjacent the cylinder 179. Importantly, the locking arm 176 is longitudinally fixed in relation to the piston. For example, the locking arm 176 is operatively coupled to the connection head 188 of the piston 181 by a fastener system such as a bolt 192 with washer 193, or by a ball stud (similar to FIG. 8) that extends through a hole 194, formed through one end of the locking arm 176, and through the connection head 188. In this way, the fastener maintains the relative position of the locking arm 176 in relation to the gas spring 178.

In operation, the locking arm 176 is shiftable from a first disengaged position where the notch 177 is spaced from the step 183, adjacent the cylinder 179, when the gas spring 178 is in the compressed configuration, to a second locking position, when the gas spring 178 is in the extended configuration, where the notch 177 engages the step 183 to block the cylinder 179 from receiving the piston 181. This shifting movement is similar to FIGS. 7 and 8 as noted above.

A further aspect of the gas spring lock 172 is a locking tab 180 that extends from the locking arm 176, adjacent the notch 177, for engaging the cylinder 179 to guide the locking arm 176 along the cylinder 179 as the gas spring 178 moves to the compressed configuration. Further, a locking collar 182 is slidably disposed adjacent the cylinder 179 for sliding movement along the same.

Directing attention to FIGS. 12 and 13, it should be understood that the locking collar 182 is slidable from a first position (FIG. 12) spaced from the locking tab 180, to a second position (FIG. 13), where the locking collar 182 is disposed between the cylinder 182 and the locking tab 180. This sliding movement is indicated by arrow 187. In this way, the locking collar 182 urges the locking tab 182 laterally away from the cylinder 179 (as indicated by arrow 185) when the gas spring 178 is in the extended configuration so that the locking arm 176 is maintained and secured in the second locking position (FIG. 13) where the notch 177 engages the step 183 to block the cylinder 179 from returning to the compressed configuration.

Additionally, in order to facilitate, and ease the sliding motion of the locking collar 182 to the second position, a portion of the locking collar 182 includes a chamfer, i.e., chamfered surface 186. Specifically, this construction allows the locking collar 182 to slide under the locking tab 180, into the second position between the cylinder 179 and the locking tab 180. As illustrated in FIGS. 9 through 13, it is typical for both ends of the locking collar 182 to be chamfered: this is due only to manufacturing considerations. Similarly, a portion of the locking tab 180 could include a chamfer 184 to further facilitate the advancement of the locking collar 182 into the second position between the cylinder and the locking tab as illustrated in FIG. 13.

Turning now to FIGS. 10 and 11, another aspect of the invention is illustrated. Specifically, in FIG. 10 the gas spring lock 172 further comprises a biasing element 196 disposed to bias the locking collar 182 to the second position, where the locking collar 182 is disposed between the cylinder 179 and the locking tab 180. In this embodiment, the biasing element 196 is a spring that is compressed between the locking collar 182 and a washer 199 that is fixed to the cylinder 179 by a weld 199. Accordingly, the spring is compressed against the locking collar 182 thereby biasing the same to assume the second position.

Similarly, the locking collar 182 could be biased toward the locking tab 180 by a biasing element 197 that is in tension as illustrated in FIG. 11. FIG. 11 illustrates a biasing element 197, which is a spring attached at one end to the locking arm 176 via a washer, and attached at the other end to the locking collar 182 such that the spring is in tension. In this way the locking collar 182 is similarly biased to the second position. Attachment of the spring to the washer at one end, and to the locking collar 182 at the other end could be accomplished any number of ways including adhesives, welds and interference fits (not illustrated)

Regarding the construction of a gas spring lock 172, plastic tubular material is typically employed. In this way, the gas spring lock 172 can be coaxially disposed about the gas spring 178 thereby facilitating a compact, inexpensive and attractive construction.

Having illustrated and described the principles of my invention in a preferred embodiment thereof, it should be readily apparent to those skilled in the art that the invention can be modified in arrangement and detail without departing from such principles. I claim all modifications coming within the spirit and scope of the accompanying claims.

What is claimed is:

1. A gas spring lock for engaging and locking a gas spring of the type having a piston that includes a connection head, wherein the piston extends from the connection head coaxially into a cylinder which slidingly receives the piston, and defines a step disposed adjacent the piston, the cylinder extending therefrom to an opposing connection head defined at the end of the opposite end of the cylinder, the gas spring being movable from a compressed configuration where the piston is substantially received into the cylinder, to an extended configuration where the piston is substantially out of the cylinder, the gas spring lock comprising:

an elongate locking arm extending along the piston, wherein a portion of the locking arm defines a notch disposed adjacent the cylinder, the locking arm being longitudinally fixed in relation to the piston;

wherein the locking arm is shiftable from a first disengaged position where the notch is spaced from the step, adjacent the cylinder, when the gas spring is in the compressed configuration, to a second locking position, when the gas spring is in the extended configuration, where the notch engages the step to block the cylinder from receiving the piston; and a locking collar slidably disposed adjacent the cylinder for sliding movement along the same, the locking collar being slidable from a first position spaced from the locking tab, to a second position, where the locking collar is disposed between the cylinder and the locking tab, to urge the locking tab laterally away from the cylinder when the gas spring is in the extended configuration so that the locking arm is maintained and secured in the second locking position where the notch engages the step to block the cylinder from returning to the compressed configuration.

2. A gas spring lock as recited in claim 1 wherein a portion of the locking collar is chamfered to facilitate the advancement of the locking collar into the second position between the cylinder and the locking tab.

3. A gas spring lock as recited in claim 2 further comprising a biasing element disposed to bias the locking collar to the second position, where the locking collar is disposed between the cylinder and the locking tab.

4. A gas spring lock for engaging and locking a gas spring of the type having a piston that includes a connection head, wherein the piston extends from the connection head coaxially into a cylinder which slidingly receives the piston, and defines a step disposed adjacent the piston, the cylinder extending therefrom to an opposing connection head defined at the end of the opposite end of the cylinder, the gas spring being movable from a compressed configuration where the piston is substantially received into the cylinder, to an extended configuration where the piston is substantially out of the cylinder, the gas spring lock comprising:

an elongate locking arm extending along the piston, wherein a portion of the locking arm defines a notch disposed adjacent the cylinder, the locking arm being longitudinally fixed in relation to the piston; and wherein the locking arm is shiftable from a first disengaged position where the notch is spaced from the step, adjacent the cylinder, when the gas spring is in the compressed configuration, to a second locking position, when the gas spring is in the extended configuration, where the notch engages the step to block the cylinder from receiving the piston; and a locking collar slidably disposed adjacent the cylinder for sliding movement along the same, the locking collar being slidable from a first position spaced from the locking tab, to a second position, where the locking collar is disposed between the cylinder and the locking tab, to urge the locking tab laterally away from the cylinder when the gas spring is in the extended configuration so that the locking arm is maintained and secured in the second locking position where the notch engages the step to block the cylinder from returning to the compressed configuration.

5. A gas spring lock as recited in claim 4 wherein a portion of the locking collar is chamfered to facilitate the advancement of the locking collar into the second position between the cylinder and the locking tab.

6. A gas spring lock as recited in claim 5 wherein a portion of the locking tab is chamfered to facilitate the advancement of the locking collar into the second position between the cylinder and the locking tab.

7. A gas spring lock as recited in claim 4 wherein a portion of the locking tab is chamfered to facilitate the advancement of the locking collar into the second position between the cylinder and the locking tab.

8. A gas spring lock as recited in claim 4 further comprising a biasing element disposed to bias the locking collar to the second position, where the locking collar is disposed between the cylinder and the locking tab.

9. A gas spring lock as recited in claim 8 wherein the biasing element is fixed to the cylinder such that the biasing element is in compression to bias the locking collar to the second position.

10. A gas spring lock as recited in claim 9 wherein the biasing element is a spring fixed to the cylinder such that it is in compression to bias the locking collar to the second position.

11. A gas spring lock as recited in claim 8 wherein the biasing element is fixed to the locking arm such that it is in tension to bias the locking collar to the second position.

12. A gas spring lock for engaging and locking a gas spring of the type having a piston that includes a connection head, wherein the piston extends from the connection head coaxially into a cylinder which slidingly receives the piston, and defines a step disposed adjacent the piston, the cylinder extending therefrom to an opposing connection head defined at the end of the opposite end of the cylinder, the gas spring being movable from a compressed configuration where the piston is substantially received into the cylinder, to an extended configuration where the piston is substantially out of the cylinder, the gas spring lock comprising:

an elongate locking arm extending along the piston, wherein a portion of the locking arm defines a notch disposed adjacent the cylinder, the locking arm being longitudinally fixed in relation to the piston; and wherein the locking arm is shiftable from a first disengaged position where the notch is spaced from the step, adjacent the cylinder, when the gas spring is in the compressed configuration, to a second locking position, when the gas spring is in the extended configuration, where the notch engages the step to block the cylinder from receiving the piston; and wherein the locking arm is tubular and is coaxially disposed around the gas spring.

13. A gas spring lock for engaging and locking a gas spring of the type having a piston that includes a connection head, wherein the piston extends from the connection head coaxially into a cylinder which slidingly receives the piston, and defines a step disposed adjacent the piston, the cylinder extending therefrom to an opposing connection head defined at the end of the opposite end of the cylinder, the gas spring being movable from a compressed configuration where the piston is substantially received into the cylinder, to an extended configuration where the piston is substantially out of the cylinder, the gas spring lock comprising:

an elongate locking arm extending along the piston, wherein a portion of the locking arm defines a notch disposed adjacent the cylinder, the locking arm being longitudinally fixed in relation to the piston; and wherein the locking arm is shiftable from a first disengaged position where the notch is spaced from the step, adjacent the cylinder, when the gas spring is in the compressed configuration, to a second locking position, when the gas spring is in the extended configuration, where the notch engages the step to block the cylinder from receiving the piston; and wherein the locking arm and socket head of the piston are interconnected by a fastener.

14. A method of making a gas spring lock for engaging and locking a gas spring of the type having a piston that includes a connection head, wherein the piston extends from the connection head coaxially into a cylinder which slidingly receives the piston, and defines a step disposed adjacent the piston, the cylinder extending therefrom to an opposing connection head defined at the end of the opposite end of the cylinder, the gas spring being movable from a compressed configuration where the piston is substantially received into the cylinder, to an extended configuration where the piston is substantially out of the cylinder, the method comprising the steps:

extending an elongate locking arm along the piston, wherein a portion of the locking arm defines a notch disposed adjacent the cylinder, the locking arm being longitudinally fixed in relation to the piston; and wherein the locking arm is shiftable from a first disengaged position where the notch is spaced from the step, adjacent the cylinder, when the gas spring is in the compressed configuration, to a second locking position, when the gas spring is in the extended configuration, where the notch engages the step to block the cylinder from receiving the piston;

forming a locking tab that extends from the locking arm, adjacent the notch, for engaging the cylinder to guide the locking arm along the cylinder as the gas spring moves to the compressed configuration; and providing a locking collar slidably disposed adjacent the cylinder for sliding movement along the same, the locking collar being slidable from a first position spaced from the locking tab, to a second position, where the locking collar is disposed between the cylinder and the locking tab, to urge the locking tab laterally away from the cylinder when the gas spring is in the extended configuration so that the locking position where the notch engages the step to block the cylinder from returning to the compressed configuration.

* * * * *